(12) United States Patent
Lee

(10) Patent No.: US 11,307,711 B2
(45) Date of Patent: Apr. 19, 2022

(54) NYQUIST SIGNAL TO NOISE REDUCTION

(71) Applicant: Tactual Labs Co., New York, NY (US)

(72) Inventor: Shawn Lee, Cedar Park, TX (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 17/086,744

(22) Filed: Nov. 2, 2020

(65) Prior Publication Data

US 2021/0278924 A1 Sep. 9, 2021

Related U.S. Application Data

(60) Provisional application No. 62/928,708, filed on Oct. 31, 2019.

(51) Int. Cl.
*G06F 3/041* (2006.01)
*H04B 17/345* (2015.01)
*G06F 3/044* (2006.01)
*H04B 15/00* (2006.01)
*G06F 3/01* (2006.01)

(52) U.S. Cl.
CPC ............ *G06F 3/0418* (2013.01); *G06F 3/011* (2013.01); *G06F 3/0446* (2019.05); *G06F 3/04166* (2019.05); *H04B 15/00* (2013.01); *H04B 17/345* (2015.01); *G06F 2203/04101* (2013.01)

(58) Field of Classification Search
CPC .... G06F 3/04166; G06F 3/0418; G06F 3/011; G06F 2203/04101; H04B 15/00; H04N 17/345; H04N 17/336
See application file for complete search history.

(56) References Cited

U.S. PATENT DOCUMENTS

| | | | |
|---|---|---|---|
| 2011/0084857 A1* | 4/2011 | Marino | G06F 3/0445 341/5 |
| 2013/0027333 A1* | 1/2013 | Nagata | G06F 3/04184 345/173 |
| 2014/0327644 A1* | 11/2014 | Mohindra | G06F 3/04182 345/174 |
| 2015/0242050 A1* | 8/2015 | Huang | G06F 3/041661 345/174 |
| 2017/0102826 A1* | 4/2017 | Hamaguchi | G06F 3/0442 |
| 2017/0228096 A1* | 8/2017 | Nathan | G06F 3/041661 |
| 2021/0011574 A1* | 1/2021 | Micci | G06F 3/04166 |

* cited by examiner

*Primary Examiner* — Liliana Cerullo
(74) *Attorney, Agent, or Firm* — Adam B. Landa

(57) ABSTRACT

A method for avoiding noise in a display involves scanning a display at a sampling rate that is less than the Nyquist level sampling. After scanning the signals received at less than the Nyquist level, the measured signals are processed in order to determine where noise may be present. Subsequently, future scans are performed at a Fast Fourier Transform is performed on the results. This is used to determine at which frequencies there is noise. Subsequent scans can be taken to determine touch events that avoid locations where noise is present.

20 Claims, 20 Drawing Sheets

NYQUIST SIGNAL TO NOISE REDUCTION

This application claims the benefit of U.S. Provisional Application Ser. No. 62/982,708 filed Oct. 31, 2019, the contents of which are incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems relate in general to the field of sensors, and in particular to sensors used for display surfaces.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments. Although example embodiments and associated data are disclosed for the purpose of illustrating the invention, other embodiments and associated data will be apparent to a person of skill in the art, in view of this disclosure, without departing from the scope and spirit of the disclosure herein.

DETAILED DESCRIPTION

Figure 1:
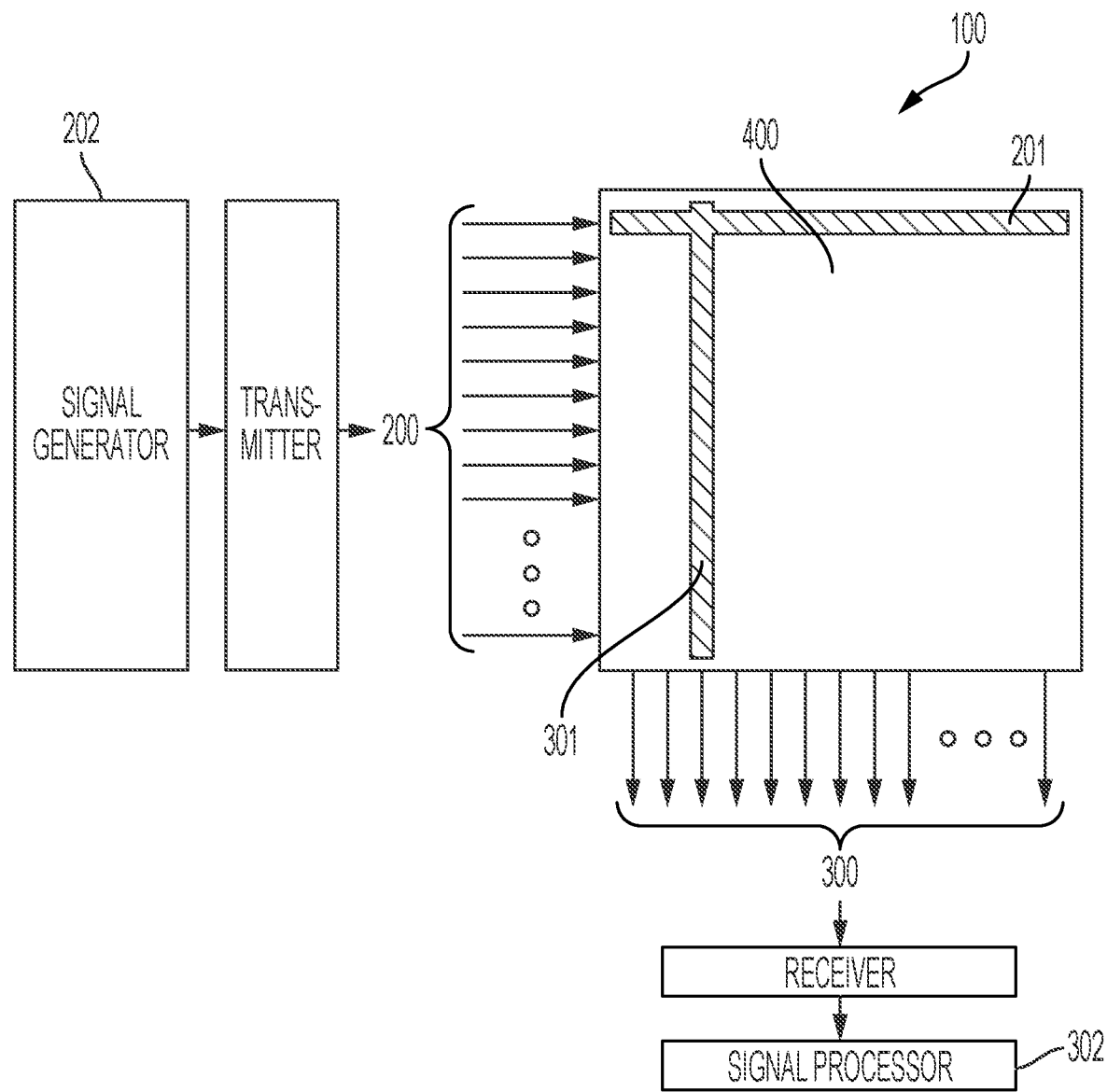
FIG. 1 is a schematic view of a sensor.

In various embodiments, the present disclosure is directed to sensors and their use in displays. It will be understood by one of ordinary skill in the art that the disclosures herein apply generally to all types of systems using displays and in particular to displays sensitive to touch. Furthermore, it should be understood that the sampling method disclosed herein can be expanded beyond displays and touch surfaces and be used for overall sensing systems.

Throughout this disclosure, the terms "touch", "touches", "touch event", "contact", "contacts", "hover", or "hovers" or other descriptors may be used to describe events or periods of time in which a key, key switch, user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" that are hovering at a distance above the touch surface or otherwise separated from the sensor device and causes a recognizable change, despite the fact that the conductive or capacitive object, e.g., a finger, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which is a "touch". Generally, as used herein, the word "hover" refers to non-contact touch events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times.

Similarly, where the context so dictates or permits, ordinal terms are intended to be broadly construed so that the two identified claim constructs can be of the same characteristic or of different characteristics. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The presently disclosed systems and methods involve principles related to and for designing, manufacturing and using capacitive based sensor systems, and particularly capacitive based sensor systems that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensor systems. In such sensor systems, interactions are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

FIG. 1 illustrates certain principles of a fast multi-touch sensor 100 in accordance with an embodiment. Transmitter 200 transmits a different signal, generated by signal generator 202, into each of the row conductors 201 of the surface 400. The signals are designed to be "orthogonal", i.e., separable and distinguishable from each other. A receiver 300 is attached to each column conductor 301 and has operatively connected thereto a signal processor 302. The row conductors 201 and the column conductors 301 are conductors/antennas that are able to transmit and/or receive signals. The receiver 300 is designed to receive any of the transmitted signals, or an arbitrary combination of them, with or without other signals and/or noise, and to individually determine a measure, e.g., a quantity for each of the orthogonal transmitted signals present on that column conductor 301. The sensor 100 comprises a series of row conductors 201 and column conductors 301 (not all shown), along which the orthogonal signals can propagate. In an embodiment, the row conductors 201 and column conductors 301 are arranged such that a touch event will cause a change in coupling between at least one of the row conductors 201 and at least one of the column conductors 301. In an embodiment, a touch event will cause a change in the amount (e.g., magnitude) of a signal transmitted on a row conductor 201 that is detected in the column conductor 301. In an embodiment, a touch event will cause a change in the phase of a signal transmitted on a row conductor 201 that is detected on a column conductor 301. Because the sensor 100 ultimately detects a touch event due to a change in the coupling, it is not of specific importance, except for reasons that may otherwise be apparent to a particular embodiment, the type of change that is caused to the touch-related coupling by a touch. As discussed above, the touch, or touch event does not require a physical touching, but rather an event that affects the coupled signal. In an embodiment the touch or touch event does not require a physical touching, but rather an event that affects the coupled signal in a repeatable or predictable manner.

With continued reference to FIG. 1, in an embodiment, generally, the result of a touch event in the proximity of both a row conductor 201 and column conductor 301 causes a change in the signal that is transmitted on a row conductor 201 as it is detected on a column conductor 301. In an embodiment, the change in coupling may be detected by comparing successive measurements on the column conductor 301. In an embodiment, the change in coupling may be detected by comparing the characteristics of the signal transmitted on the row conductor 201 to a measurement made on the column conductor 301. In an embodiment, a change in coupling may be measured both by comparing successive measurements on the column conductor 301 and by comparing known characteristics of the signal transmitted on the row conductor 201 to a measurement made on the column conductor 301. More generally, touch events cause, and thus correspond to, measurements of the signals on the column conductors 301. Because the signals on the row conductors 201 are orthogonal, multiple row signals can be coupled to a column conductor 301 and distinguished by the receiver 300. Likewise, the signals on each row conductor 201 can be coupled to multiple column conductors 301. For each column conductor 301 coupled to a given row conductor 201 (and regardless of how touch affects the coupling between the row conductor and column conductor), the signals measured on the column conductor 301 contain information that will indicate which row conductors 201 are being touched simultaneously with that column conductor 301. The magnitude or phase shift of each signal received is generally related to the amount of coupling between the column conductor 301 and the row conductor 201 carrying the corresponding signal, and thus, may indicate a distance of the touching object to the surface, an area of the surface covered by the touch and/or the pressure of the touch.

In various implementations of a touch event enabled device, physical contact with the row conductors 201 and/or column conductors 301 is unlikely or impossible as there may be a protective barrier between the row conductors 201 and/or column conductors 301 and the finger or other object of touch. Moreover, generally, the row conductors 201 and column conductors 301 themselves are not in physical contact with each other, but rather, placed in a proximity that allows signal to be coupled there-between, and that coupling changes with touch. Generally, the row conductor-column conductor coupling results not from actual contact between them, nor by actual contact from the finger or other object of touch, but rather, by the effect of bringing the finger (or other object) into proximity—which proximity results in a change of coupling, which effect is referred to herein as touch.

In an embodiment, the orientation of the row conductors 201 and column conductors 301 may vary as a consequence of a physical process, and the change in the orientation (e.g., movement) of the row conductors 201 and/or column conductors 301 with respect to one-another may cause a change in coupling. In an embodiment, the orientation of a row conductor 201 and a column conductor 301 may vary as a consequence of a physical process, and the range of orientation between the row conductor 201 and column conductor 301 include ohmic contact, thus in some orientations within a range a row conductor 201 and column conductor 301 may be in physical contact, while in other orientations within the range, the row conductor 201 and column conductor 301 are not in physical contact and may have their coupling varied. In an embodiment, when a row conductor 201 and column conductor 301 are not in physical contact their coupling may be varied as a consequence of moving closer together or further apart. In an embodiment, when a row conductor 201 and column conductor 301 are not in physical contact their coupling may be varied as a consequence of grounding. In an embodiment, when a row conductor 201 and column conductor 301 are not in physical contact their coupling may be varied as a consequence of materials translated within the coupled field. In an embodiment, when a row conductor 201 and column conductor 301 are not in physical contact their coupling may be varied as a consequence of a changing shape of the row conductor 201 or column conductor 301, or an antenna associated with the row conductor or column conductor.

The nature of the row conductors 201 and column conductors 301 is arbitrary and the particular orientation is variable. Indeed, the terms row conductor 201 and column conductor 301 are not intended to refer to a square grid, but rather to a set of conductors upon which signal is transmitted (rows) and a set of conductors onto which signal may be coupled (columns). The notion that signals are transmitted on row conductors 201 and received on column conductors 301 itself is arbitrary, and signals could as easily be transmitted on conductors arbitrarily designated columns and received on conductors arbitrarily named rows, or both could arbitrarily be named something else. Further, it is not necessary that row conductors 201 and column conductors 301 be in a grid. Other shapes are possible as long as a touch event will affect a row-column coupling. For example, some of the conductors could be in concentric circles and some of the conductor could be spokes radiating out from the center. And neither the "rows conductors" nor the "column conductors" need to follow any geometric or spatial pattern, thus, for example, the keys on a keyboard could be arbitrarily connected to form row conductors 201 and column conductors 301 (related or unrelated to their relative positions). Moreover, an antenna or electrode may be used as a row conductor 201 and it should be understood that the terms are being used interchangeably. Antennas, electrodes or conductors may be round or rectangular, or have substantially any shape, or a shape that changes. An antenna, electrode or conductor used as a row conductor 201 may be oriented in proximity to one or more conductors, or one or more other antennas that act as column conductors 301. In other words, in an embodiment, an antenna may be used for signal transmission and oriented in proximity to one or more conductors, or one or more other antennas that are used to receive signals. A touch will change the coupling between the antenna used for signal transmission and the signal used to receive signals.

It is not necessary for there to be only two types of signal propagation channels: instead of row conductors 201 and column conductors 301, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. It is also contemplated that the signal propagation channels can simultaneously support transmitters and receivers—provided that the signals transmitted are orthogonal, and thus separable, from the signals received. Three or more types of antenna or conductors may be used rather than just "rows" and "columns." Many alternative embodiments are possible and will be apparent to a person of skill in the art after considering this disclosure.

It is likewise not necessary for there to be only one signal transmitted on each transmitting media. In an embodiment, multiple orthogonal signals are transmitted on each row. In an embodiment, multiple orthogonal signals are transmitted on each transmitting antenna or transmitting conductor.

Returning briefly to FIG. 1, as noted above, in an embodiment, the sensor 100 is operably connected to a touch surface 400 and comprises a series of row conductors 201 and column conductors 301, along which signals can propagate. As discussed above, the row conductors 201 and column conductors 301 are oriented so that, when they are not being touched the signals are coupled differently than when they are being touched. The change in signal coupled between them may be generally proportional or inversely proportional (although not necessarily linearly proportional) to the touch such that touch is measured as a gradation, permitting distinction between more touch (i.e., closer or firmer) and less touch (i.e., farther or softer)—and even no touch.

A receiver 300 is attached to each column conductor 301, which has a signal processor 302 operatively connected thereto. The receiver 300 is designed to receive the signals present on the column conductors 301, including any of the orthogonal signals, or an arbitrary combination of the orthogonal signals, and any noise or other signals present. Generally, the receiver is designed to receive a frame of signals present on the column conductors 301, and to identify the columns providing signal. A frame of signals is received during an integration period or sampling period. In an embodiment, the signal processor 302 associated with the receiver data may determine a measure associated with the quantity of each of the orthogonal transmitted signals present on that column conductor 301 during the time the frame of signals was captured. In this manner, in addition to identifying the row conductors 201 in touch with each column conductor 301, the receiver can provide additional (e.g., qualitative) information concerning the touch. In general, touch events may correspond (or inversely correspond) to the received signals on the column conductors 301. For each column conductor 301, the different signals received thereon indicate which of the corresponding row conductors 201 is being touched simultaneously with that column conductor 301. In an embodiment, the amount of coupling between the corresponding row conductor 201 and column conductor 301 may indicate, e.g., the area of the surface covered by the touch, the pressure of the touch, etc. In an embodiment, a change in coupling over time between the corresponding row conductor 201 and column conductor 301 indicates a change in touch at the intersection of the two.

In an embodiment, a mixed signal integrated circuit comprises signal generator, transmitter, receiver and signal processor. In an embodiment, the mixed signal integrated circuit is adapted to generate one or more signals and send the signals to transmit antennas. In an embodiment, the mixed signal integrated circuit is adapted to generate a plurality of frequency-orthogonal signals and send the plurality of frequency-orthogonal signals to the transmit antenna. In an embodiment, the mixed signal integrated circuit is adapted to generate a plurality of frequency-orthogonal signals and send one or more of the plurality of frequency-orthogonal signals to each of a plurality of row conductors. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of an integration period (i.e., the sampling period).

In an embodiment, the signal processor of a mixed signal integrated circuit (or a downstream component or software) is adapted to determine at least one value representing each frequency orthogonal signal transmitted to a row conductor. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decreased, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as a measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to touch. In other words, the measure corresponding to signal strength in a given bin would change as a result of a touch event.

When dealing with a touch panel or display employing sensors, such as described above, many factors come into play that governs the detection of signals and consequently touch events. The crosstalk between row conductors and column conductors plays a role in determining touch events. The coupling magnitude and the phase in any region of the display or the sensor also plays a role in determining the touch events. For example, the type of conductor material used for the row conductors and column conductors plays a factor in determining touch events. The mutual capacitance in the near field between a row conductor and another row conductor also plays a factor in determining touch events. The mutual capacitance between a row conductor and another column conductor plays a factor in determining touch events. The mutual capacitance between a column conductor and another column conductor plays a factor in determining touch events. The mutual inductance in the near field between a row conductor and another row conductor plays a factor in determining touch events. The mutual inductance between a row conductor and another column conductor plays a factor in determining touch events. The mutual inductance between a column conductor and another column conductor plays a factor in determining of touch events. The dielectric and permeability characteristics of the materials between, on, and near row conductors and column conductors additionally play a factor in the determination of touch events.

The signal processor is able to analyze the received signals and detect small changes in the crosstalk/coupling due to the various factors that impact the sensor. At each sensed row conductor/column conductor coupling that is greater than the absolute magnitude of a driven frequency or frequencies of signals can be detected and analyzed by the signal processor. The real component of the received signal of a driven frequency or frequencies of a signal can be detected and analyzed by the signal processor. The imaginary component of the received signal of a driven frequency or frequencies of the signals can be detected and analyzed by the processor. The phase relationship with respect to the real and imaginary components of a driven frequency or frequencies of the coupled signal can increase, decrease, or stay the same with respect to each orthogonal frequency divided separable frequency. These changes can be detected and analyzed by the signal processor.

These detectable changes in received signal components for coupling are repeated for every unique sensed row conductor/column conductor coupling for the entire sensor. Mathematical comparisons can then be made between any two or more sensed row conductor/column conductor coupling, amongst any region or neighborhood of nearby sensed row conductor/column conductor coupling, and/or amongst any two or more such regions. The detectable changes are used in order to create "heatmaps." A "heatmap" is a manifestation of the activity on the row conductors and the column conductors.

When images are displayed on a display there is increased interference with signals that are transmitted and received for the purpose of determining touch. The displaying of images with cause fluctuations in the signal to noise ratios and signals received that are indicative of touch will fluctuate. Frequency division multiplexing increases in difficulty when the frequency spectrum of noise overlaps with the frequency of a touch signal. Further difficulties occur when frequencies of the noise generated by the display change due to changes in the images being displayed.

As discussed above, during the processing of signals the received signals are transformed into bins of information, each reflecting the frequency of a frequency-orthogonal signal received. The sampling time implemented impacts the likelihood that signals that are caused by noise will end up in one of the bins that are related to the signal. The more spacing between bins the less likely that a noise signal will interfere with the peak of any one particular bin. More spacing results in a longer sampling time therefore making the sampling time less desirable in terms of being able to rapidly determine changes in touch.

Nyquist sampling is when a bandlimited continuous time signal is sampled and reconstructed from its samples when the waveform is sampled at least twice as fast as its highest frequency component. The Nyquist sampling rate is two times the highest frequency of the input signal. Therefore if the highest frequency component was 1 Mhz then the Nyquist sampling rate would be 2 Mhz. This permits reconstruction of the signal that is received. Higher sampling rates than the Nyquist sampling rate will permit reconstruction of the received signal with higher fidelity. The examples discussed below are discussed in the context of a 1 Mhz highest frequency component system, wherein 2 Mhz would be Nyquist sampling rate.

Figure 2:
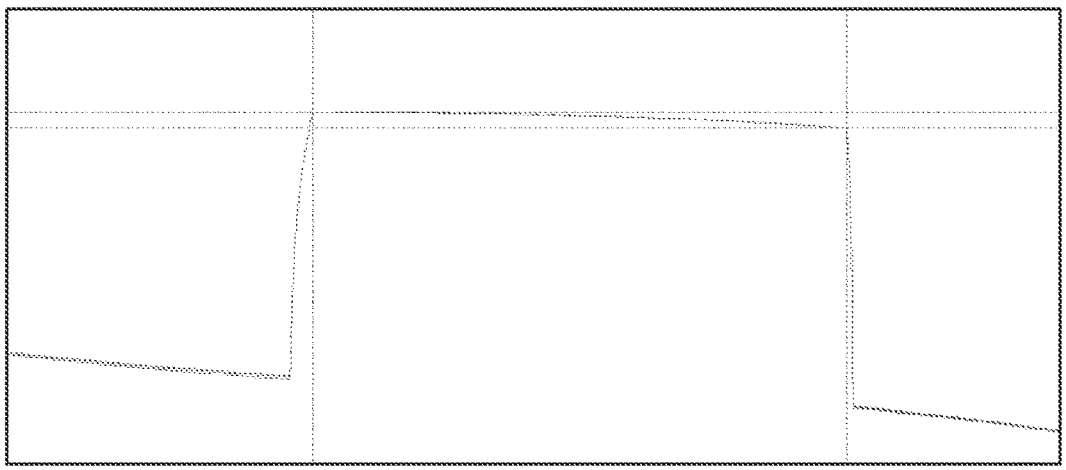
FIG. 2 is a display showing a 1024 µS sampling time.

Turning to FIG. 2, FIG. 2 is a display showing a 1024 μS sampling time. This sampling time is used for the half Nyquist sampling rate. In this setup the bins in which the measured signals are placed are very close together. Thus many bins exhibit peaks since random noise that is not at a transmitted frequency used for touch sensing will fill the bins in addition to the signals that are being used. Therefore this sampling time results in a high signal to noise ratio. Using a sampling time that is this short makes it difficult to distinguish whether or not a meaningful measurement is being made.

Figure 3:
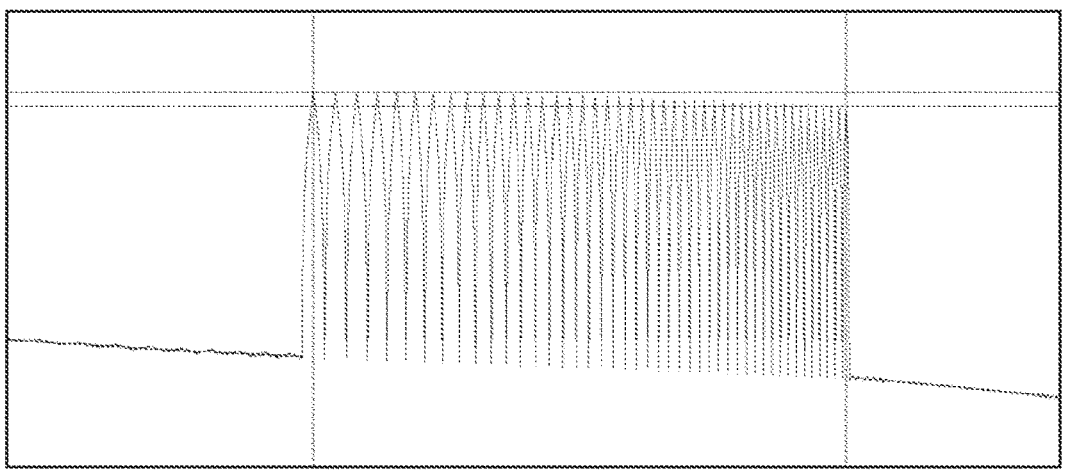
FIG. 3 is a display showing a 2048 µS sampling time.

FIG. 3 is a display showing a 2048 μS sampling time and the same frequency spectrum as that used in FIG. 2. This sampling time is used for the Nyquist sampling rate. In this setup the bins in which the measured signals are placed are set up in a Nyquist sampling arrangement for this particular frequency spectrum, which is using the same frequency spectrum as set up in FIG. 2. Because the sampling time that is being limited is larger the bins are spaced further apart and there is less detection of noise related frequencies in the measured signals.

Figure 4:
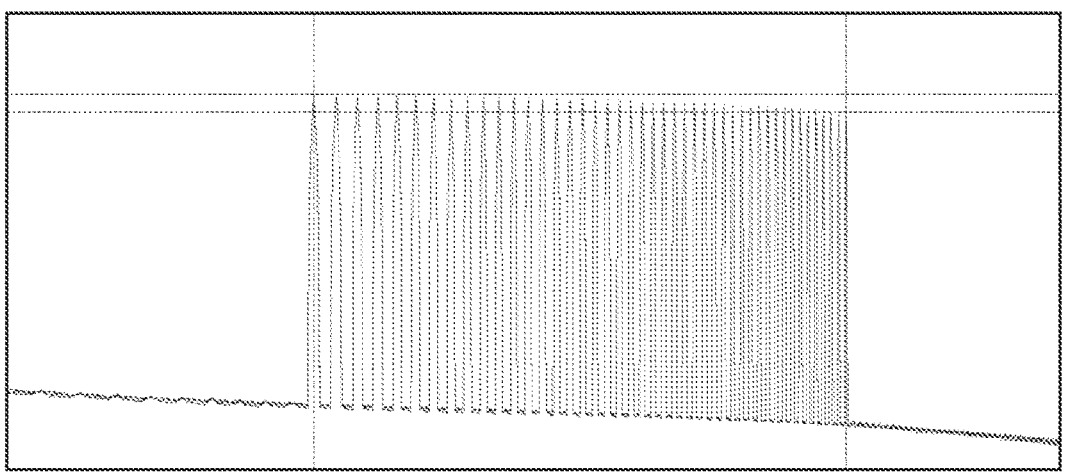
FIG. 4 is a display showing a 4096 µS sampling time.

FIG. 4 is a display showing a 4096 μS sampling time. This sampling time is used for a double the Nyquist sampling rate. In this setup the bins in which the measured signals are placed have an even greater spacing for this particular frequency spectrum, which is using the same frequency spectrum as set up in FIGS. 2 and 3. Because the bins are spaced further apart there is less detection of noise related frequencies.

Figure 5:
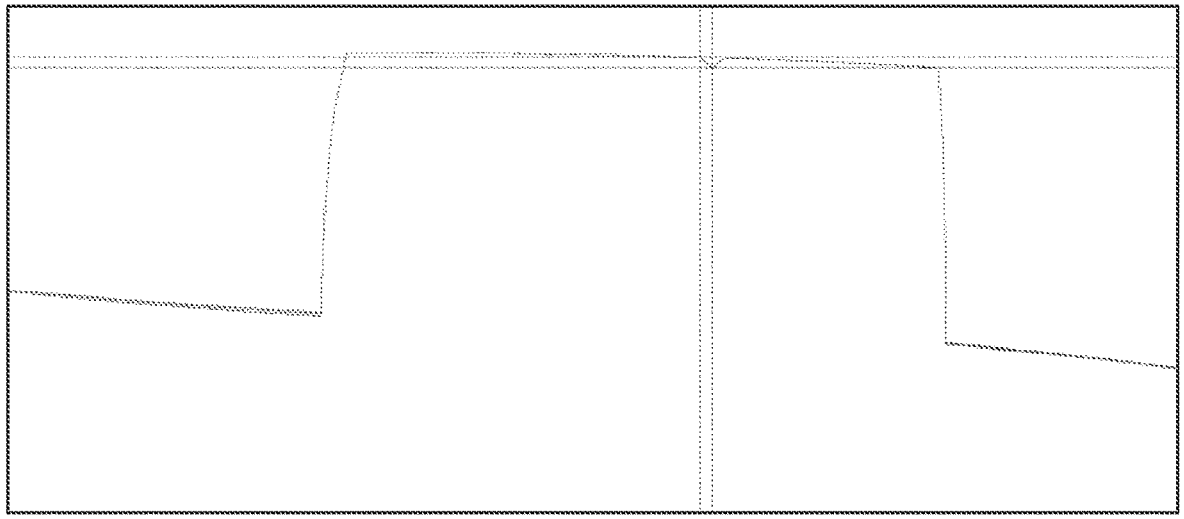
FIG. 5 is a display showing touch sensitivity at a 1024 µS sampling time.
Figure 6:
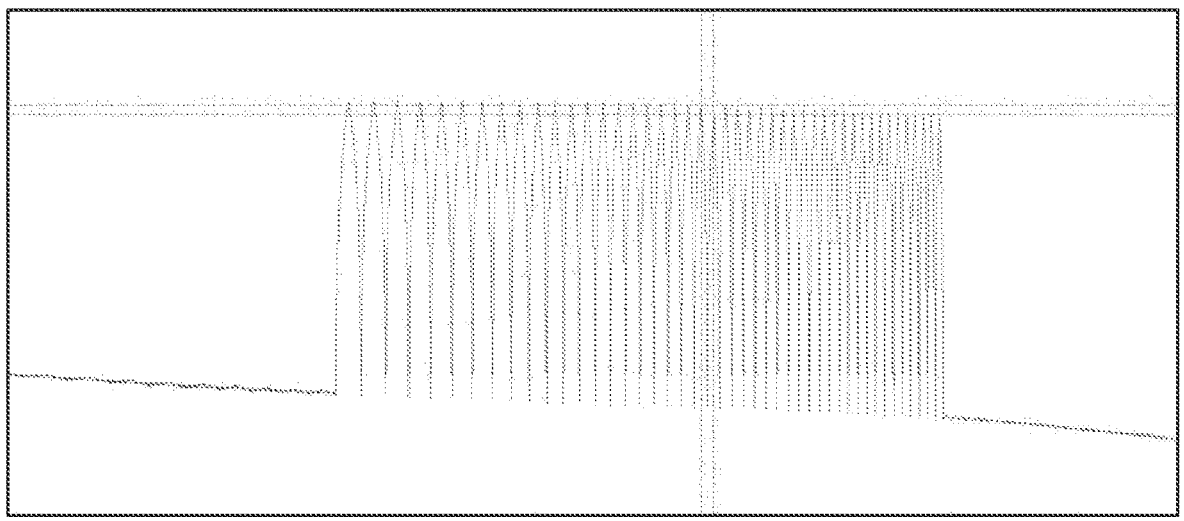
FIG. 6 is a display showing touch sensitivity at a 2048 µS sampling time.
Figure 7:
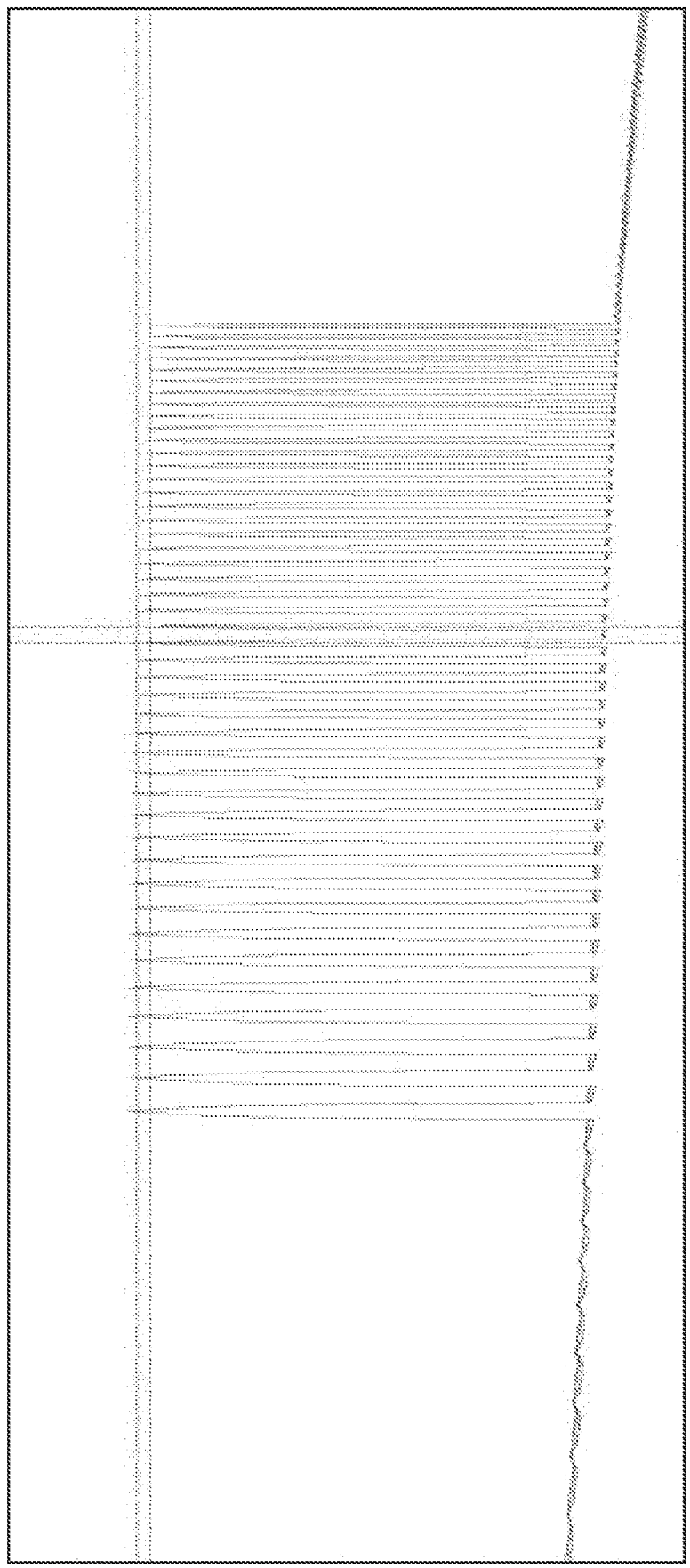
FIG. 7 is a display showing touch sensitivity at a 4096 µS sampling time.

FIG. 5 is a display showing touch sensitivity at a 1024 μS sampling time. FIG. 6 is a display showing touch sensitivity at a 2048 μS sampling time. FIG. 7 is a display showing touch sensitivity at a 4096 μS sampling time. The touch sensitivity for the three sampling times is substantially the same.

Figure 8:
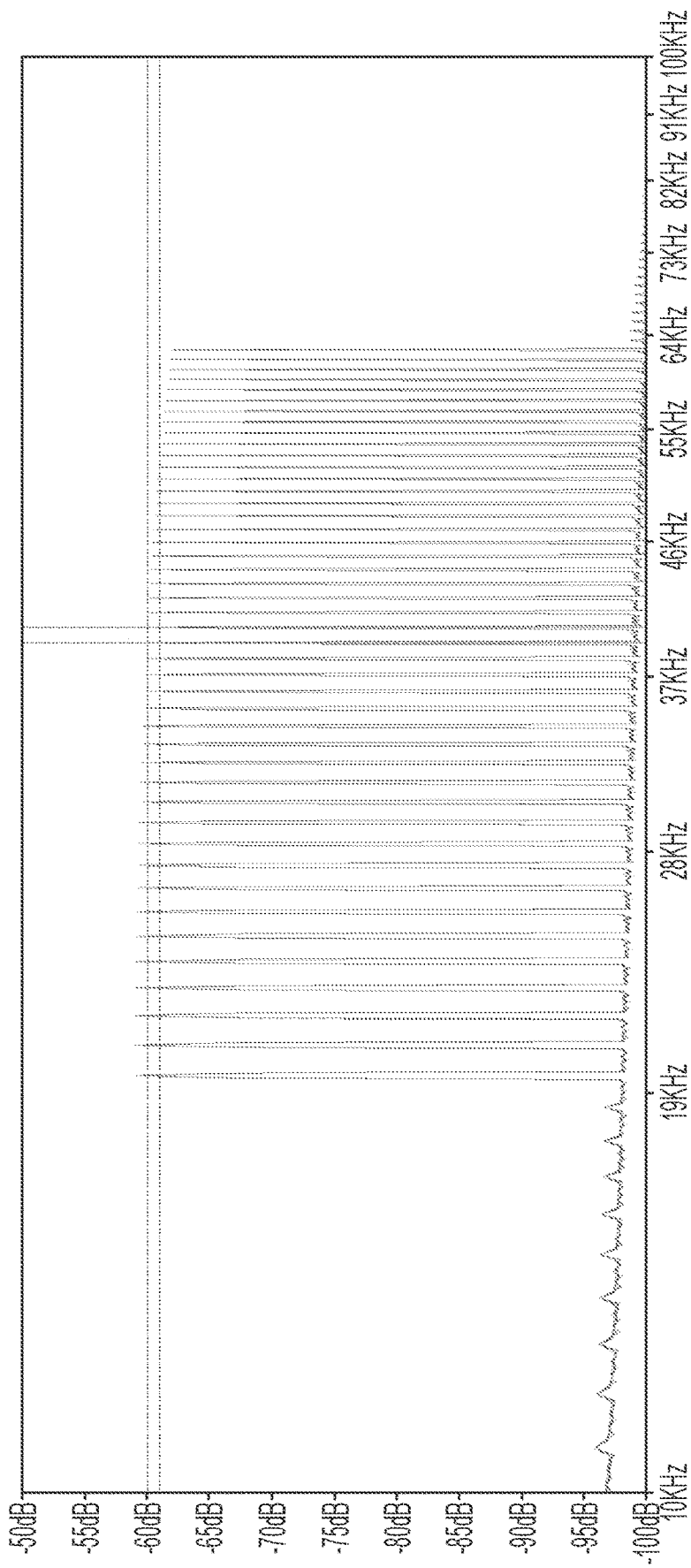
FIG. 8 is a display showing a 8192 µS sampling time.

FIG. 8 is a display showing a 8192 μS sampling time. This sampling time is used for four times the Nyquist sampling rate. This sampling time increases the time in which touches can be determined and reduces the noise that is detected by the touch sensing system. The spacing of the bins is further apart and signals that are in the valleys instead of peaks are easily rejected as the result of noise. However, due to the increased sensing time, the number of reported touches is diminished with respect to the other touch senses that occur.

Figure 9:
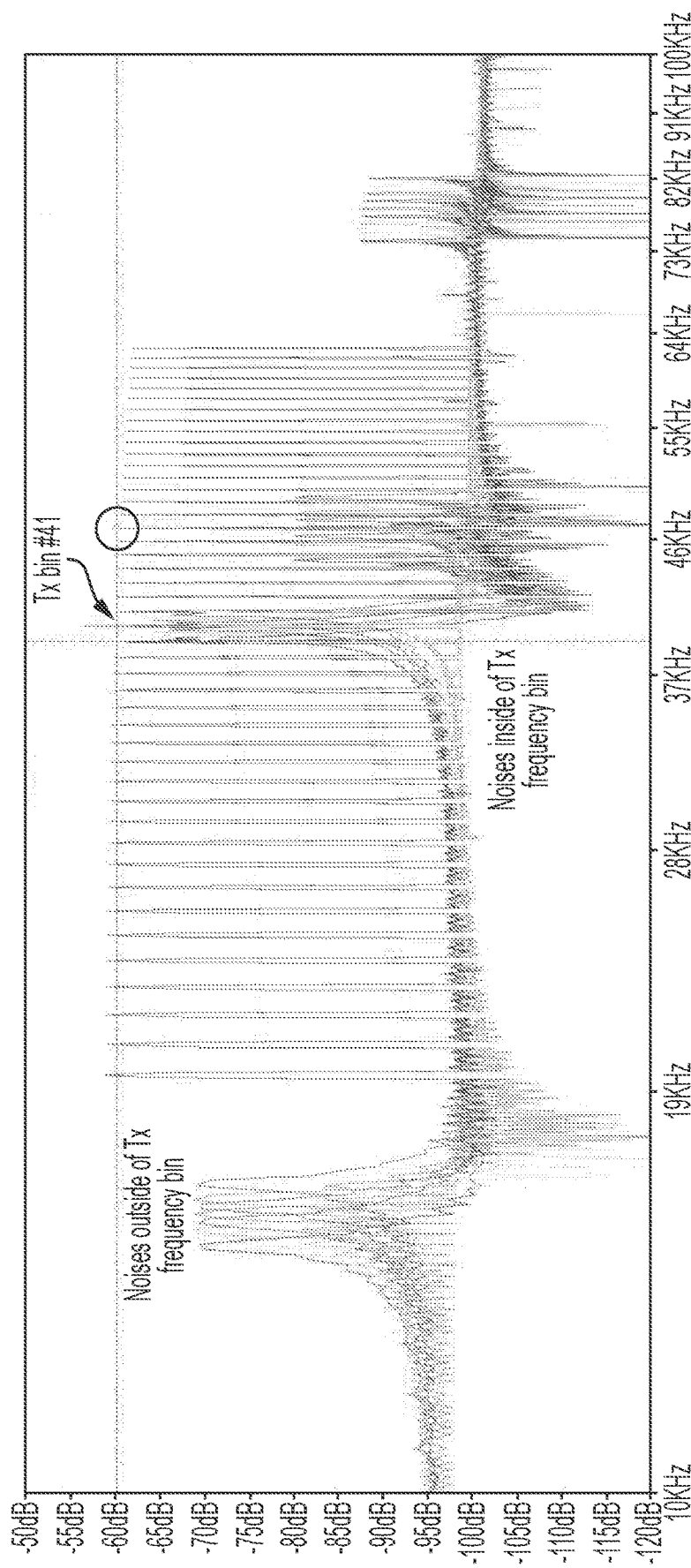
FIG. 9 is a display showing a noise influence simulation at a 8192 µS sampling time.
Figure 10:
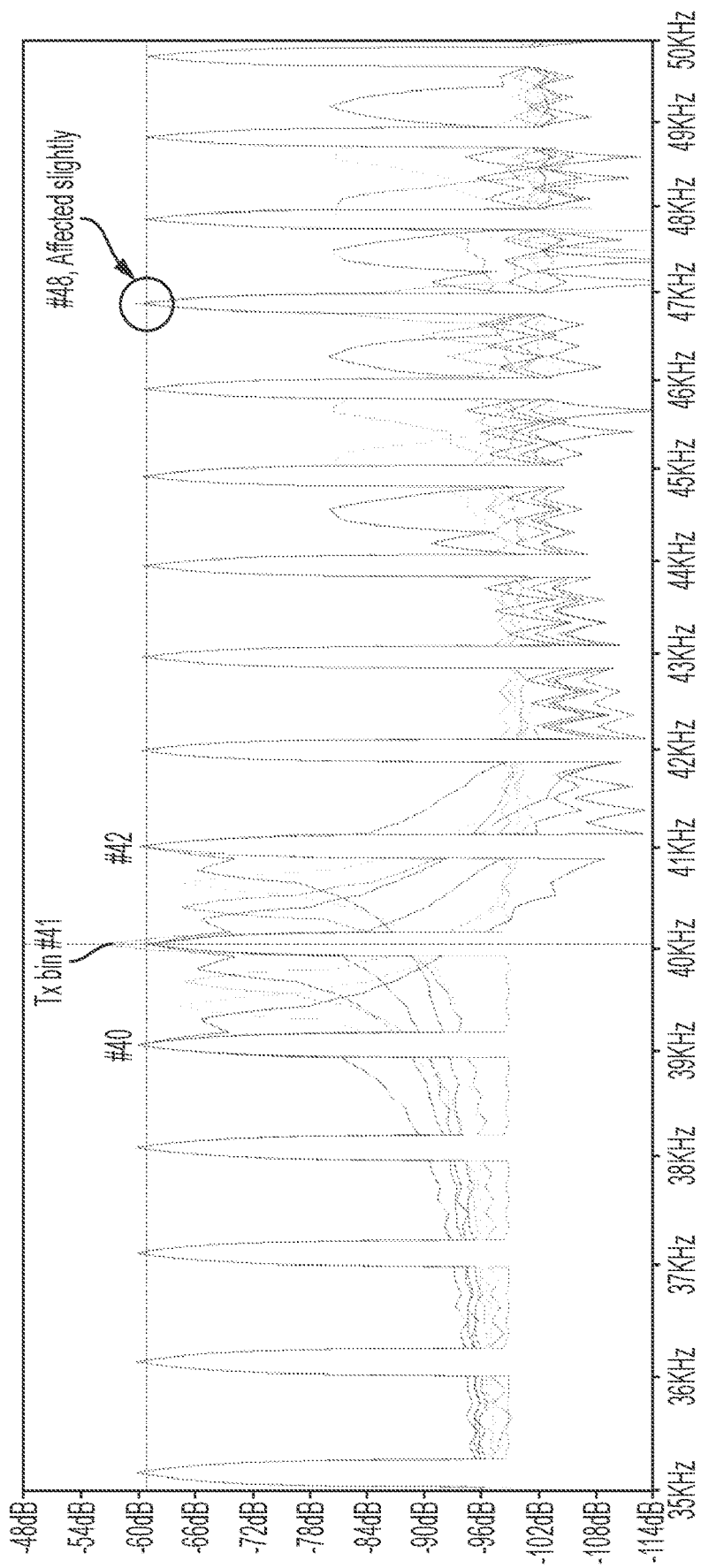
FIG. 10 is another display showing a noise influence simulation at a 8192 µS sampling time.

FIGS. 9 and 10 are displays showing a noise influence simulation at a 8192 μS sampling time. The displays show that only noise that falls within a sensing frequency bin will cause issues with respect to the noise. By avoiding those bins, noise can be eliminated and touch accuracy improved. However, the sensing time is increased.

Figure 11:
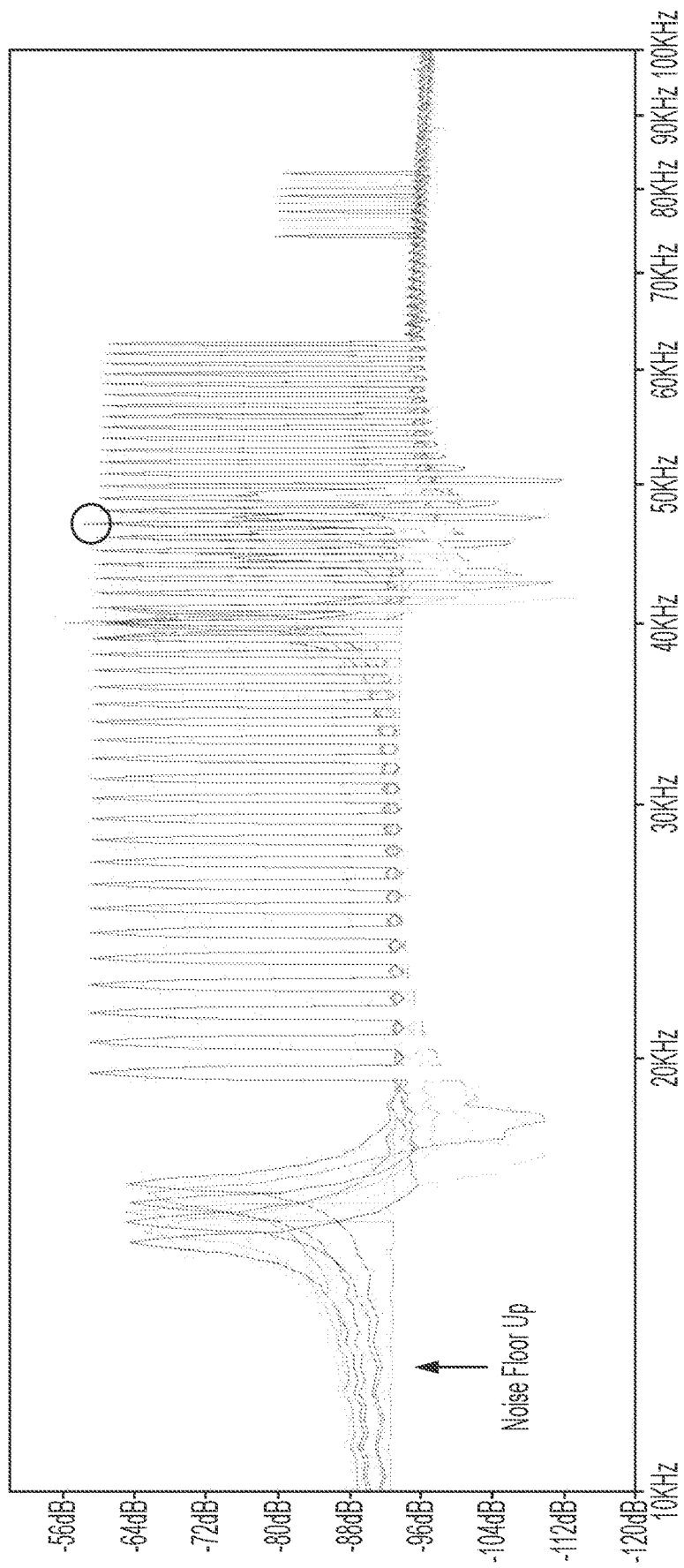
FIG. 11 is a display showing a noise influence simulation at a 4096 µS sampling time.
Figure 12:
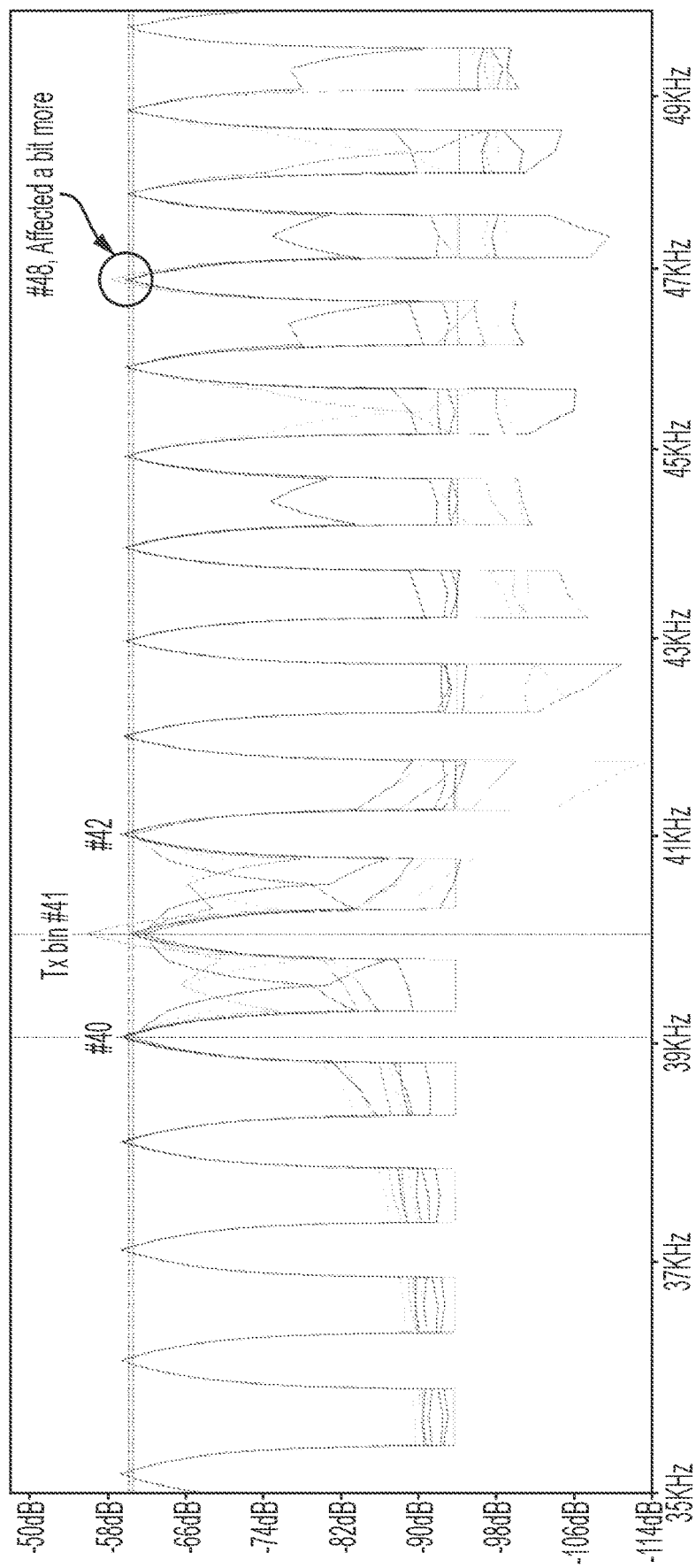
FIG. 12 is another display showing a noise influence simulation at a 4096 µS sampling time.

FIGS. 11 and 12 are displays showing a noise influence simulation at a 4096 μS sampling time. The displays show noise that falls within a sensing frequency bin will cause issues with respect to the determination of touch events. Touch sensitivity of adjacent bins are also affected by the presence of noise in those bins. By avoiding those bins that have noise present and potentially avoiding adjacent bins, noise can be eliminated and touch accuracy improved. In an embodiment, bins that have noise in them are avoided during future sampling periods. In an embodiment, bins that have noise and bins adjacent to the bins with noise are avoided during future sampling periods. In an embodiment, bins that have noise in them and multiple bins adjacent to the bins that have noise are avoided during future sampling periods.

Figure 13:
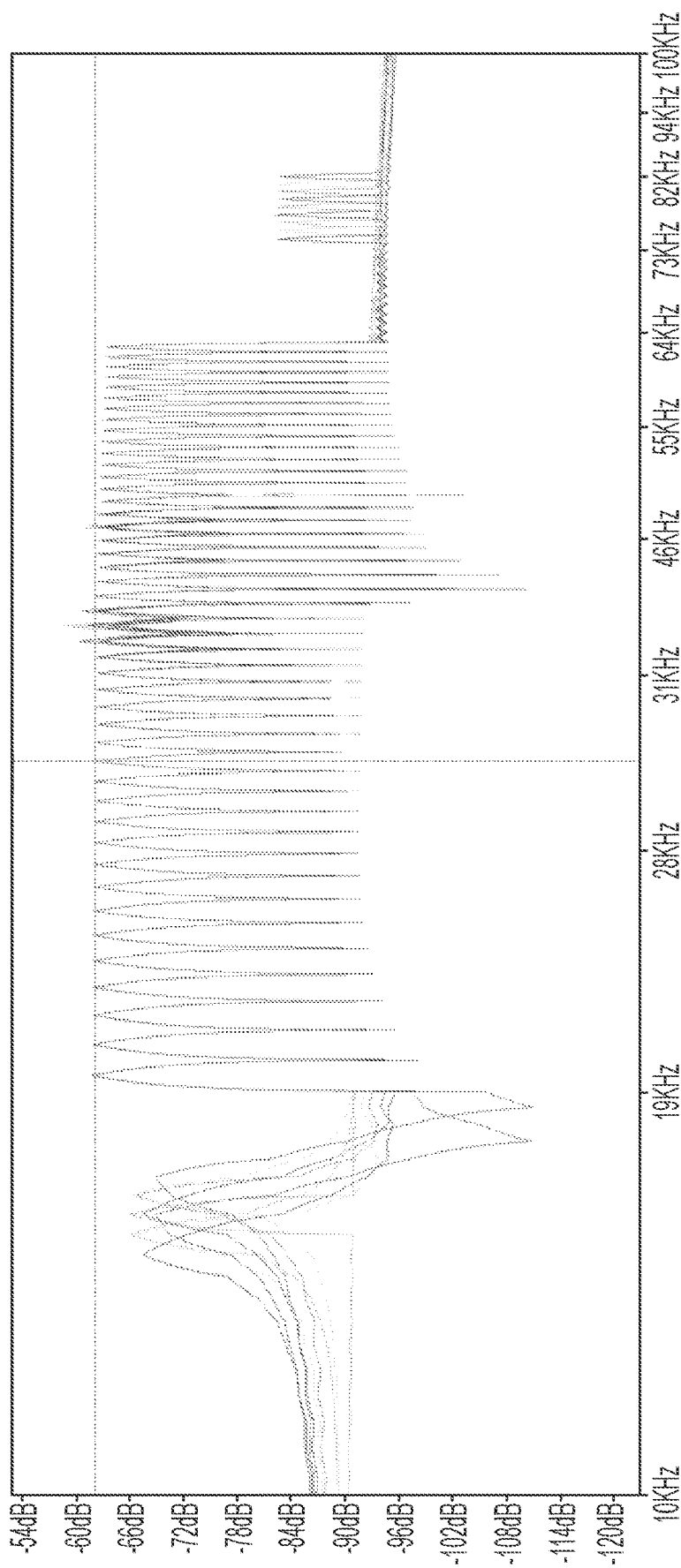
FIG. 13 is a display showing a noise influence simulation at a 2048 µS sampling time.
Figure 14:
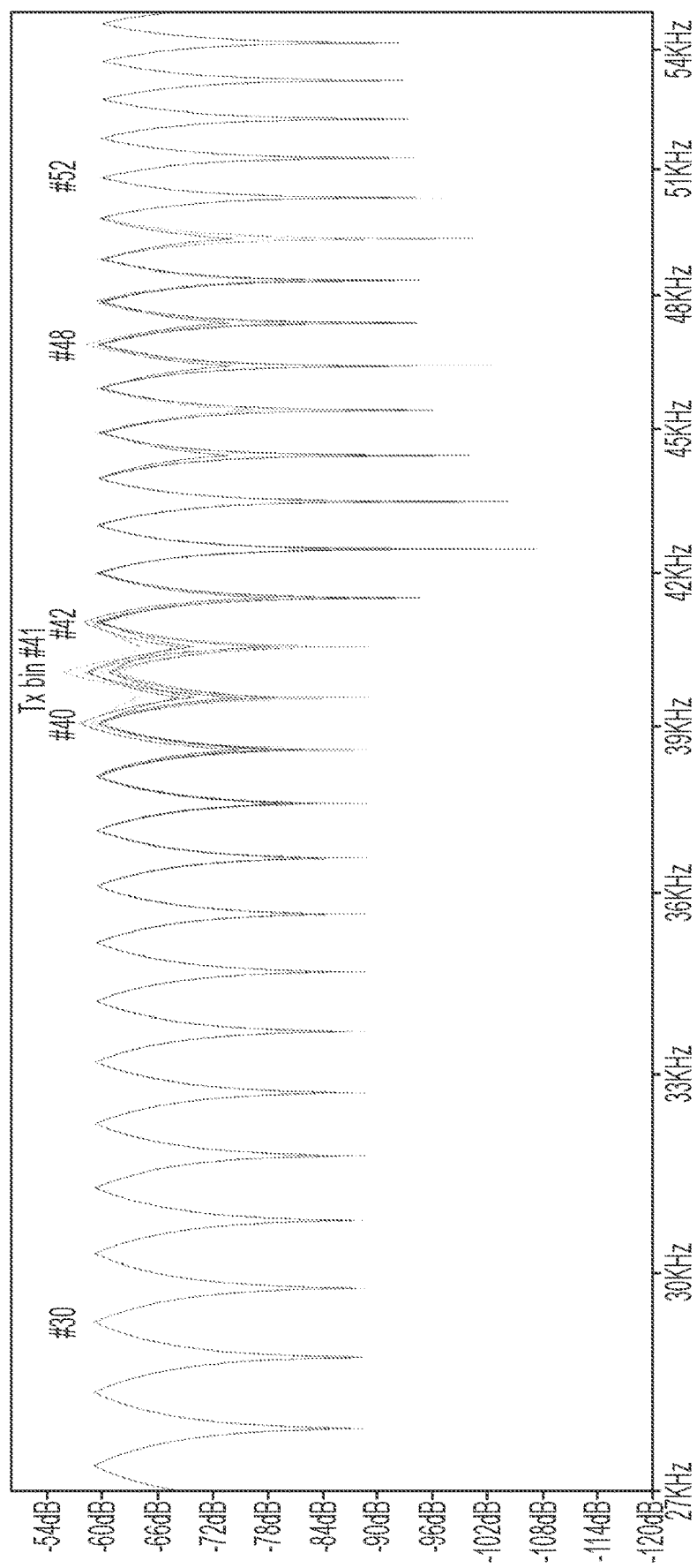
FIG. 14 is another display showing a noise influence simulation at a 2048 µS sampling time.

FIGS. 13 and 14 are displays showing a noise influence simulation at a 2048 μS sampling time. At this scanning level the touch sensitivity of nearby bins are impacted by noise in nearby bins. Bins adjacent to the impacted bin are not reliable for use in touch determination. Bins that are identified as unreliable can be removed in determining and reporting touch events.

Figure 15:
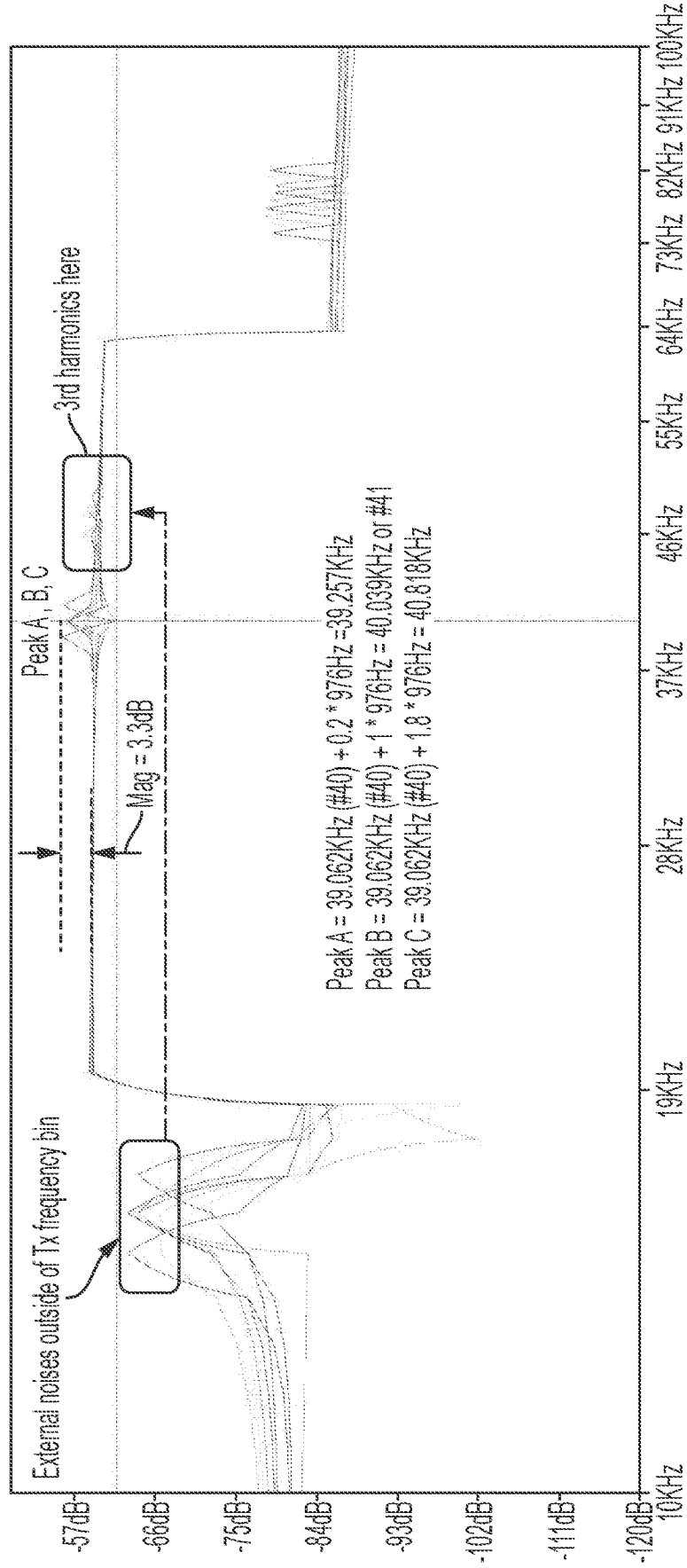
FIG. 15 is a display showing a noise influence simulation at a 1024 µS sampling time (one half Nyquist sampling time for the given example).

FIG. 15 is a display showing a noise influence simulation at a 1024 μS sampling time (this is a half Nyquist sampling rate sampling time for the given example). The touch signals result in a flat frequency response for the transmitted touch signals. Related noise and harmonics will result in greater than the flat response that is exhibited by touches. These results are then able to be used to identify which bins may not be useful and thus which frequencies may be avoided in order to avoid the impact of noise in interfering with the determination of touch results. That is to say the half Nyquist sampling for this frequency range can be used to identify those bins that are predisposed to noise. Thus those identified bins can be eliminated when reporting touch events.

Figure 16:
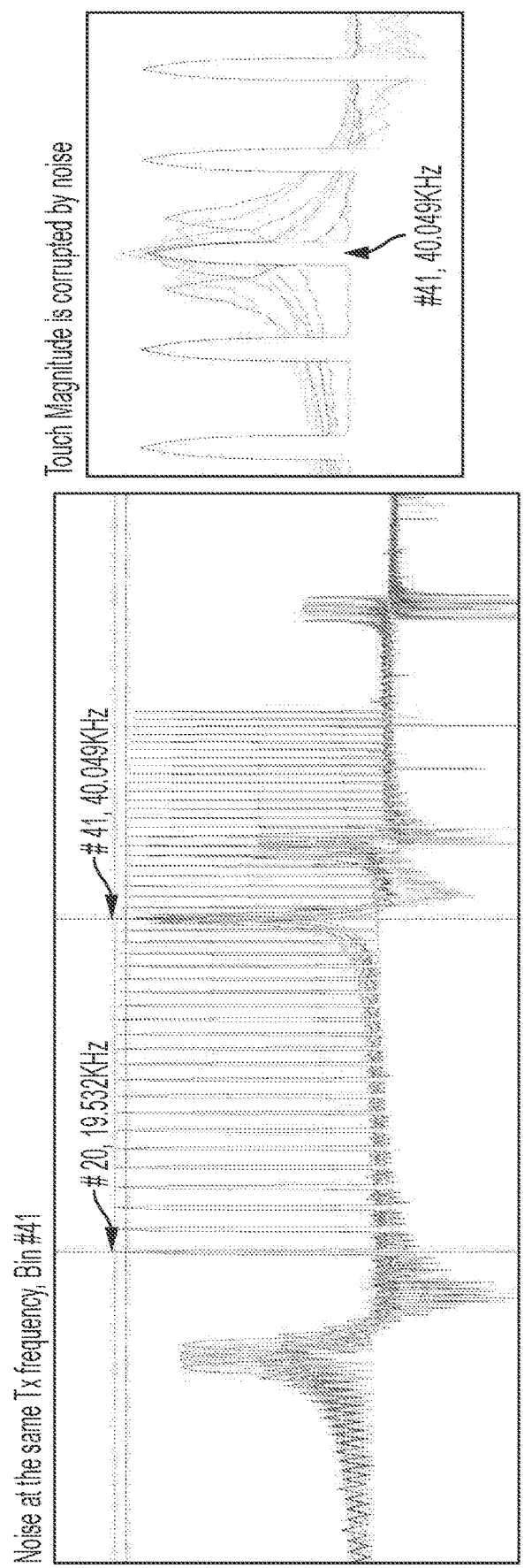
FIG. 16 shows noise mitigation at 2 MHz/4096 samples, with an 8192 µS sampling time.
Figure 17:
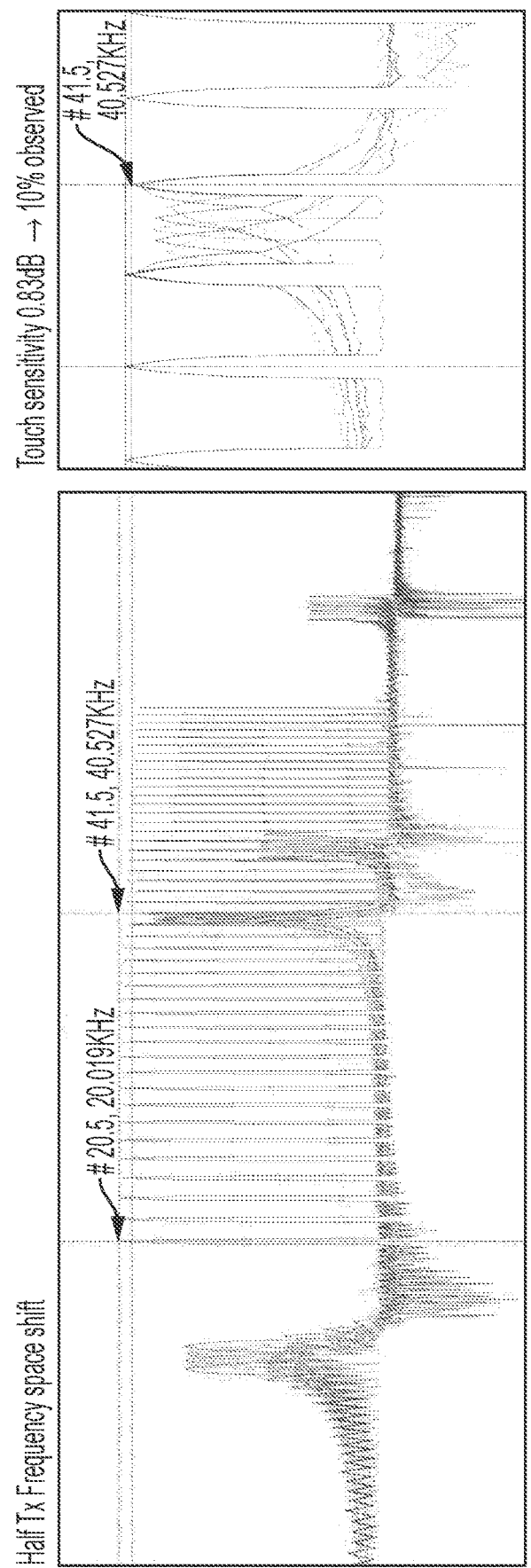
FIG. 17 shows noise mitigation at 2 MHz/4096 samples, with an 8192 µS sampling time.

FIGS. 16 and 17 show noise mitigation at 2 MHz/4096 samples, with an 8192 μS sampling time. By applying the faster sampling time, such as discussed above with respect to FIG. 15, noises and harmonics at certain frequencies can be identified rapidly and then those frequencies can be avoided during a regular scan. As a general rule, longer scanning time will result in a lower amount of noise and usable bins, but will also result in a slower touch reporting rate. In other words, a longer sample time causes a slower touch reporting rate.

For example, a 16 MHz range using 4096 bins can implement a 512 μS sampling time. Higher sampling speed causes wider transmitting space. By wider transmitting space it is meant that the frequency spacing is greater. So for a 16 MHz sample with 4096 bins, the spacing between each of the frequencies is 3.906 KHz spacing.

Figure 18:
FIG. 18 is a display showing touch only.
Figure 19:
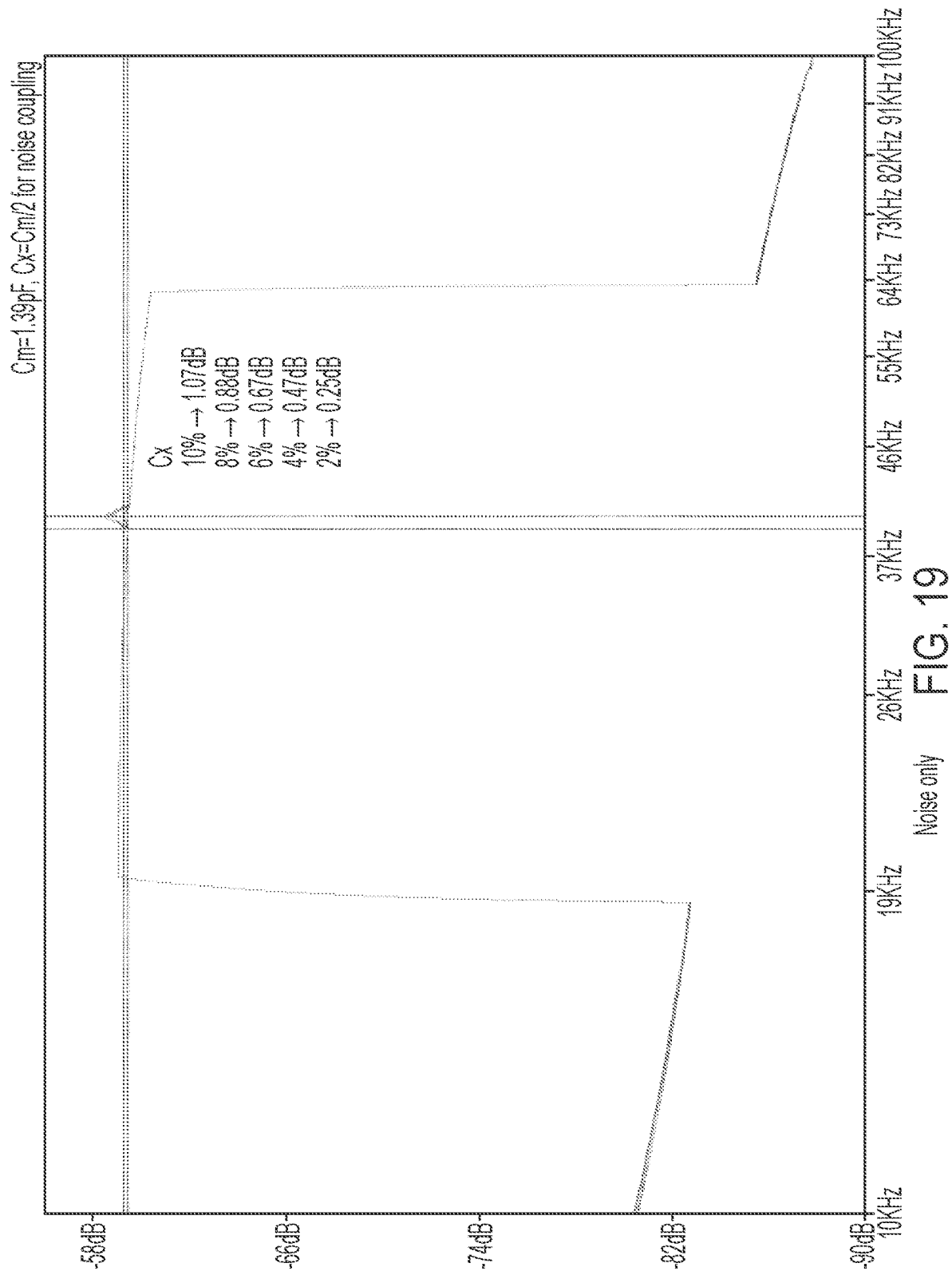
FIG. 19 is a display showing noise only.
Figure 20:
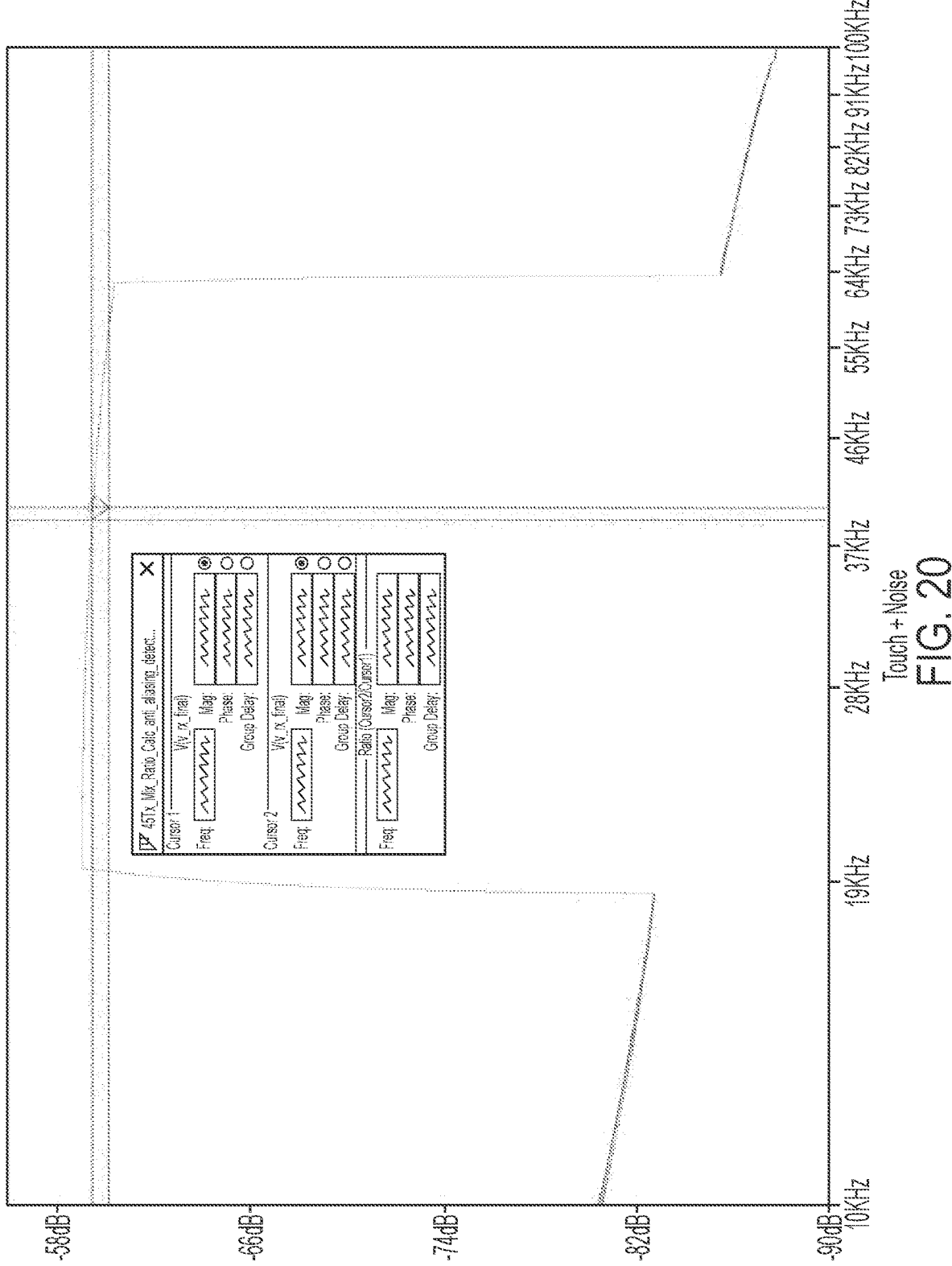
FIG. 20 is a display showing touch and noise.
Figure 21:
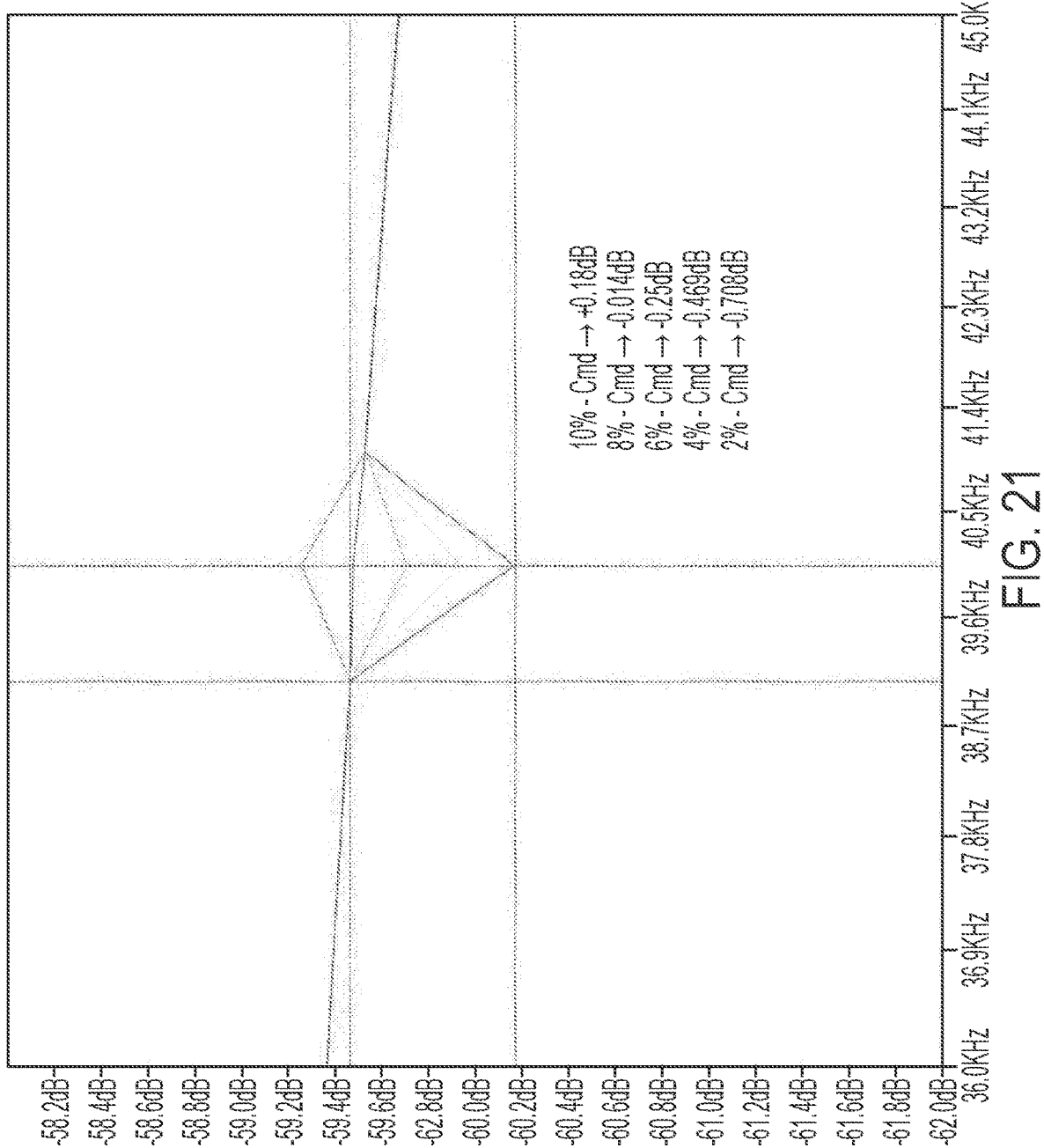
FIG. 21 is a display showing touch and noise.

FIG. 18 is a display showing touch events only at a bin and the impact that the capacitance coupling will have. FIG. 19 shows the impact that noise is having at that bin. FIGS. 20 and 21 show how the two combined impact each other. A drop of 10% in the mutual capacitance may be cancelled by a 10% noise increase at the same transmitting frequency when noise coupling capacitance is 50% of the mutual capacitance.

Figure 22:
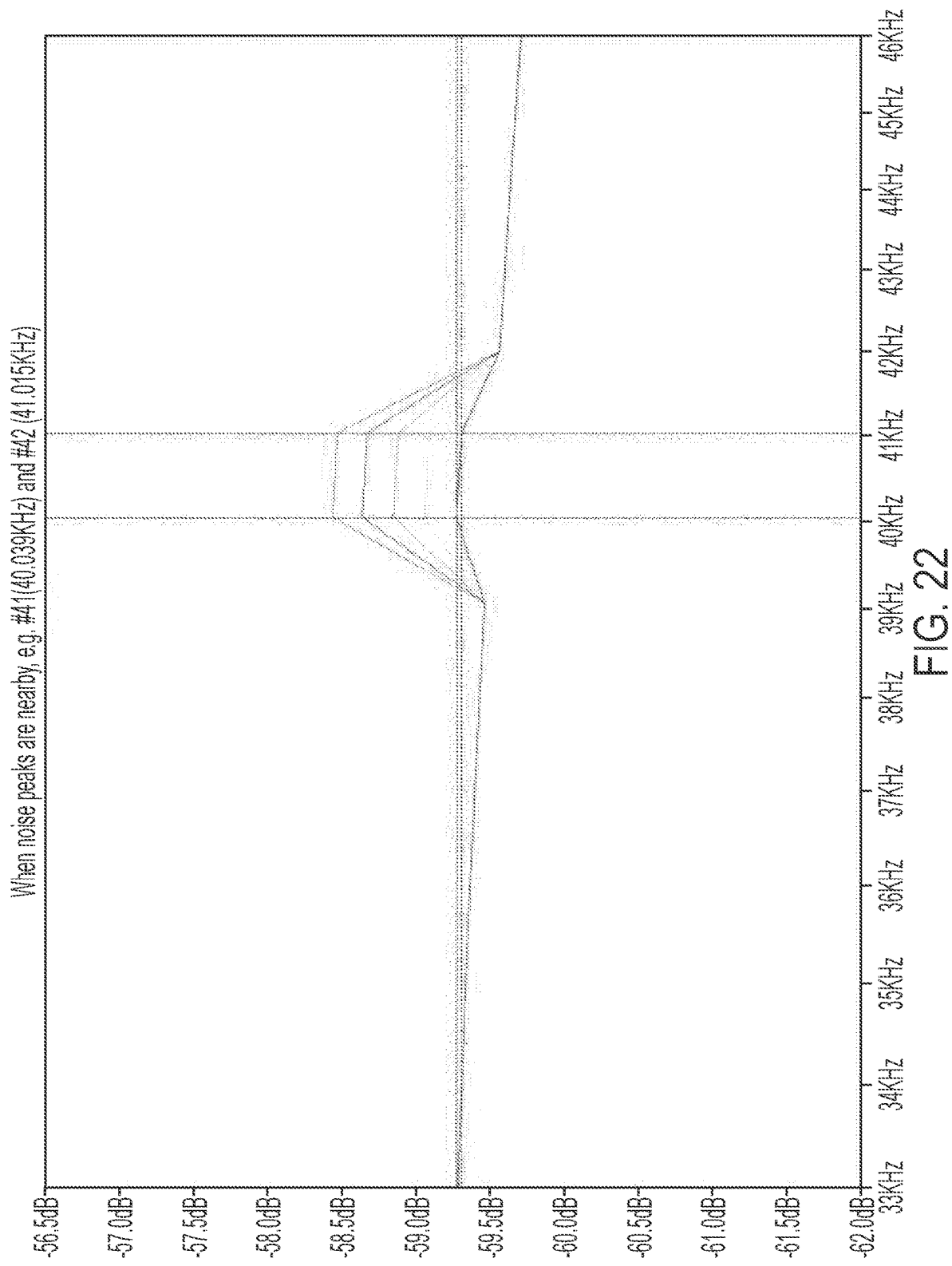
FIG. 22 is a display showing usage of the one half Nyquist sampling.
Figure 23:
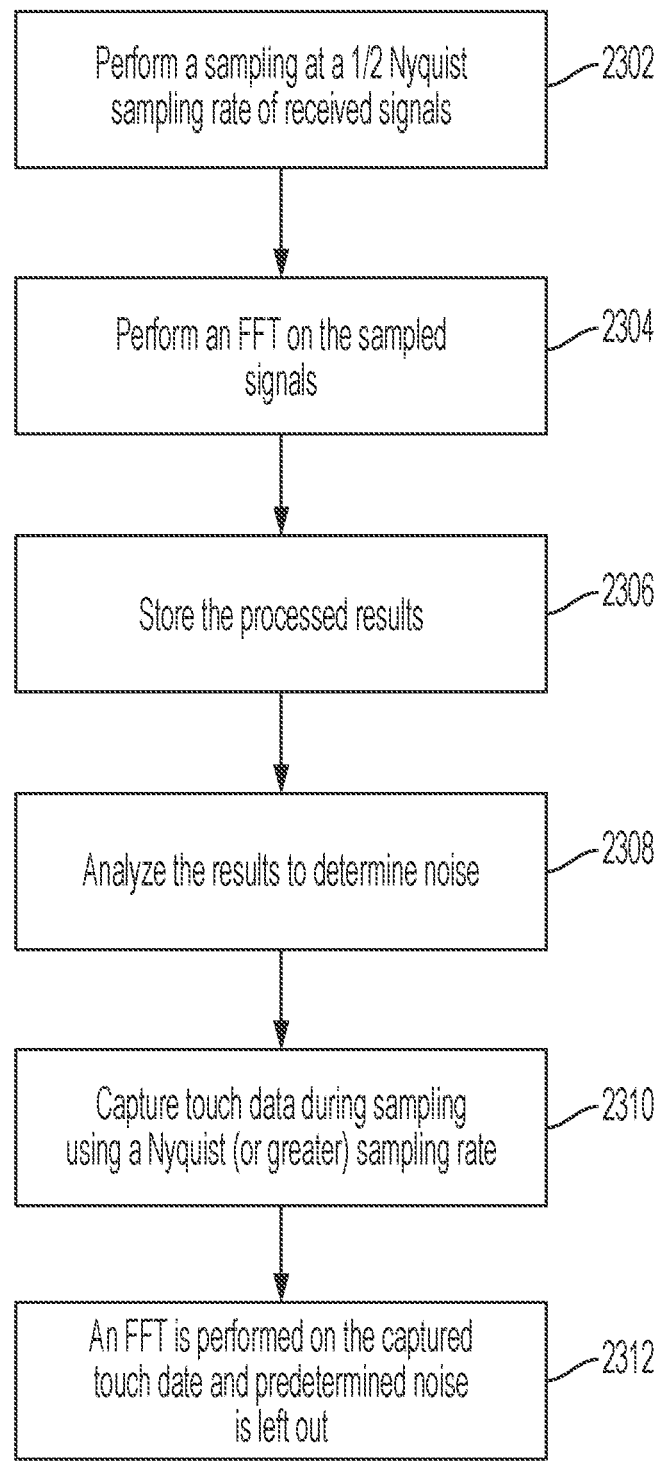
FIG. 23 is a flow-chart of the half-Nyquist noise mitigating method.

FIG. 22 is a display showing usage of a half Nyquist sampling rate. The proposed method for mitigation of the noise can be done to determine the presence of external and internal noise. In an embodiment, the touch signal level can be determined by removing possible external noise, for example by turning off the display. In an embodiment, the noise level measurement may be based on the touch signal level for determining transmitting frequency hopping.

An exemplary embodiment is shown in FIG. 13, in step 2302, a half Nyquist sampling rate is taken in order to determine noise. Signals received are sampled. For example a scanning at a 1024 μS sampling time (when the Nyquist sampling time would be 2048 μS). In an embodiment, the sampling may be performed at less than the sampling rate of half Nyquist sampling rate. For example, a sampling time at 512 μS will also result in determination of additional noise signals. In an embodiment, the sampling time is a fraction of the Nyquist sampling rate. In an embodiment, the sampling time is less than the Nyquist signaling rate.

In an embodiment, more than one scan at progressively decreased scanning rates are performed in order to determine the level of noise. For example, a scan at three quarters the Nyquist sampling rate can be performed, then a scan at half the Nyquist sampling rate and then a scan at one fourth the Nyquist sampling rate. These scans can be performed until a certain level of threshold noise is determined. After a certain level of threshold noise is determined, that determined noise can then be used in order to establish which bins can be avoided during future scans. This is discussed further below.

In step 2304, a Fast Fourier Transform (FFT) is performed on the measurements taken during the sampling rate performed in step 2302. In an embodiment, a different Discrete Fourier Transform is performed. As discussed above the taking of the FFT will place magnitudes of measured signals into bins that are separated from each other based on the rate at which the received signals were sampled.

In step 2306 the results of the FFT performed on the received signals are stored for further processing. In step 2308, the results are analyzed in order to determine which bins are affected by noise. Bins that are exhibiting more than a threshold level of signal are used in order to ascertain if there is noise. In an embodiment, certain bins are determined to be impacted only if a certain threshold measurement is determined for a particular bin. The bins that would be impacted may be ignored when determining if a touch event has occurred. In an embodiment, nearby bins of the bins determined to be impacted by noise may also be ignored.

In step 2310, touch data is captured during the Nyquist sampling time. In an embodiment, the sampling time is greater than the Nyquist sampling time. In an embodiment, the sampling time is some multiple of the Nyquist sampling time. In step 2312 an FFT is performed on the signals that are received during the Nyquist sampling time and the results of the FFT are reported and those results that are potentially impacted by the noise analysis determined in step 2308 may be left out of reported touch event data.

In an embodiment, another sampling at the half Nyquist sampling rate is performed to measure noise after the initial sampling at the half Nyquist sampling rate performed in 2302. An FFT is performed on the resulting measurements and compared to the measurements determined from the prior sampling at the half Nyquist sampling rate. If the resulting measurements are the same there is no need to compensate for those areas where noise may be located. For example, if the measurements are the same then there is no need for transmitting frequency hopping. In an embodiment, if the measurements are not the same then the bins are remapped accordingly and additional touch events are determined. It should be understood by one of skill in the art in view of this disclosure that variation of these steps discussed above may be done as needed.

In an embodiment, instead of scanning for noise after every touch event scan the scan for noise occurs after every two touch event scans. In an embodiment, instead of scanning for noise after every touch event scan the scan for noise occurs after every three touch event scans. In an embodiment, instead of scanning for noise after every touch event scan the scan for noise occurs after every four touch event scans. In an embodiment, instead of scanning for noise after every touch event scan the scan for noise occurs after every ten touch event scans. In an embodiment, instead of scanning for noise after every touch event scan the scan for noise occurs after a certain threshold level of noisy touch event scans is achieved.

In an embodiment, a sampling at less than Nyquist sampling rate is performed when a certain level of noise is determined to be present in a touch event scan. So for example, the sensing system may be performing sampling scans until there is a determination that too many incorrect events are being detected. Once a threshold level of incorrect events is detected the system could perform a sampling at less than Nyquist sampling rate, such as the half Nyquist sampling rate. This sampling at that sampling rate can then be used in order to determine where noise is located and the system can proceed with another sampling scan at the at least Nyquist sampling rate.

While the aforementioned disclosure is applicable to touch sensors and displays, it is also applicable to other systems that make use of transmitting antennas and receiving antennas that are adapted to receive the signals that are transmitted. For example the aforementioned disclosure can be used when determining position and pose for various body parts when using a determination of measurements from received signals. The measurements from received signals can be determined using DFT's, such as FFTs.

The several embodiments discussed above illustrate a variety of methods for avoiding noise in a touch panel, but are not intended to limit the scope of the claims. Other variations of the method will become apparent to persons of skill in the art in view of this disclosure, and are thus included within the scope of this disclosure.

An aspect of the disclosure is a method for avoiding noise in a sensing system. The method comprising: sampling a first plurality of signals received at receiving antennas at a sampling rate less than a Nyquist sampling rate for signals transmitted during a first period of time; performing a Discrete Fourier Transform on measurements of the first plurality of signals; determining noise from performance of the Discrete Fourier Transform on the first plurality of signals; sampling a second plurality of signals received at receiving antennas at a sampling rate that is at least a Nyquist sampling rate for signals transmitted during a second period of time; performing a Discrete Fourier Transform on measurements of the second plurality of signals; and determining events from results of performing a Discrete Fourier Transform on measurements of the second plurality of signals while avoiding noise determined from the first plurality of signals.

Another aspect of the disclosure is a sensing system. The sensing system comprising: a plurality of antennas adapted to receive signals; a processor adapted to; sample a first plurality of signals received at the plurality of receiving antennas at a sampling rate less than a Nyquist sampling rate for signals transmitted during a first period of time; perform a Discrete Fourier Transform on measurements of the first plurality of signals; determine noise from performance of the Discrete Fourier Transform on the first plurality of signals; sample a second plurality of signals received at receiving antennas at a sampling rate that is at least a Nyquist sampling rate for signals transmitted during a second period of time; perform a Discrete Fourier Transform on measurements of the second plurality of signals; and determine events from results of performing a Discrete Fourier Transform on measurements of the second plurality of signals while avoiding noise determined from the first plurality of signals.

While the invention has been particularly shown and described with reference to a preferred embodiment thereof, it will be understood by those skilled in the art that various changes in form and details may be made therein without departing from the spirit and scope of the invention.

The invention claimed is:

1. A method for avoiding noise in a sensing system, comprising:
    sampling a first plurality of signals received at receiving antennas at a sampling rate less than a Nyquist sampling rate for signals transmitted during a first period of time;
    performing a Discrete Fourier Transform on measurements of the first plurality of signals;
    determining noise from performance of the Discrete Fourier Transform on the first plurality of signals;
    sampling a second plurality of signals received at receiving antennas at a sampling rate that is at least a Nyquist sampling rate for signals transmitted during a second period of time;
    performing a Discrete Fourier Transform on measurements of the second plurality of signals; and
    determining events from results of performing a Discrete Fourier Transform on measurements of the second plurality of signals while avoiding noise determined from the first plurality of signals.

2. The method of claim 1, wherein the sampling rate for the first plurality of signals transmitted during the first plurality of time is a half Nyquist sampling rate.

3. The method of claim 1, wherein the sampling rate for the second plurality signals transmitted during the second plurality of time is a twice Nyquist sampling rate.

4. The method of claim 1, further comprising sampling a third plurality of signals received at receiving antennas at a sampling rate less than a Nyquist sampling rate for signals transmitted during a third period of time;
    performing a Discrete Fourier Transform on measurements of the third plurality of signals; and
    determining noise from performance of the Discrete Fourier Transform on the third plurality of signals.

5. The method of claim 4, wherein the sampling of the third plurality of signals is not performed until mis-identified events exceed a threshold level.

6. The method of claim 1, wherein performing the Discrete Fourier Transform on measurements of the second plurality of signals comprises placing measurements of each of the second plurality of signals into bins.

7. The method of claim 6, wherein bins correlated with noise are avoided when determining events.

8. The method of claim 6, wherein bins correlated with noise and bins impacted by the bins correlated with noise are avoided when determining events.

9. The method of claim 1, wherein the events are touch events from a touch sensitive display device.

10. The method of claim 1, wherein the events are motion and pose events of a body part.

11. The method of claim 1, wherein the Discrete Fourier Transform is a Fast Fourier Transform.

12. The method of claim 1, wherein each signal transmitted during the second period of time is frequency orthogonal to each other signal transmitted during the second period of time.

13. A sensing system, comprising:
    a plurality of antennas adapted to receive signals;
    a processor adapted to;
        sample a first plurality of signals received at the plurality of receiving antennas at a sampling rate less than a Nyquist sampling rate for signals transmitted during a first period of time;
        perform a Discrete Fourier Transform on measurements of the first plurality of signals;
        determine noise from performance of the Discrete Fourier Transform on the first plurality of signals;
        sample a second plurality of signals received at receiving antennas at a sampling rate that is at least a Nyquist sampling rate for signals transmitted during a second period of time;
        perform a Discrete Fourier Transform on measurements of the second plurality of signals; and
        determine events from results of performing a Discrete Fourier Transform on measurements of the second plurality of signals while avoiding noise determined from the first plurality of signals.

14. The system of claim 13, wherein the sampling rate for the first plurality of signals transmitted during the first plurality of time is a half Nyquist sampling rate.

15. The system of claim 13, wherein the sampling rate for the second plurality signals transmitted during the second plurality of time is a twice Nyquist sampling rate.

16. The system of claim 13, wherein the processor is adapted to place the measurements of the second plurality of signals into bins.

17. The system of claim 16, wherein the processor is adapted to not use bins correlated with noise when determining events.

18. The system of claim 16, wherein the processor is adapted to not use bins correlated with noise and bins impacted by the bins correlated with noise when determining events.

19. The system of claim 13, wherein the events are touch events from a touch sensitive display device.

20. The system of claim 13, wherein the events are motion and pose events of a body part.

\* \* \* \* \*